Patented July 31, 1951

2,562,200

UNITED STATES PATENT OFFICE 2,562,200

PROCESS FOR MAKING D-GLUCURONIC ACID AND ITS SALTS

Charles L. Mehltretter, Peoria, Ill., assignor to the United States of America as represented by the Secretary of Agriculture No Drawing. Application April 24, 1950, Serial No. 157,841

5 Claims. (Cl. 260—333)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to a method for preparing D-glucuronic acid and its salts by catalytic oxidation of alpha-methyl-D-glucoside. According to the present invention, alpha-methyl-D-glucoside is oxidized in the presence of a catalyst to alpha-methyl-D-glucuronoside. The latter compound is subsequently hydrolyzed, preferably as the crude oxidation mixture, by mineral acids to produce a mixture of organic acids containing predominately D-glucuronic acid.

The invention also includes the recovery of D-glucuronic acid from the crude hydrolysis mixture by crystallization as its alkali metal or ammonium aniline N-D-glucuronoside. The alkali metal or ammonium salt of D-glucuronic acid is readily obtained by heating an acidified aqueous solution of the corresponding salt of aniline N-D-glucuronoside. This liberates the aniline which may be removed by extraction with a selective solvent, such as ether or benzene. Alternatively, the recovery step may be effected by treating the salt of aniline N-D-glucuronoside with benzaldehyde to form benzal-aniline which is readily removed by extraction.

In the recovery steps noted in the foregoing paragraph the D-glucuronate salt is present in the aqueous layer, separate from the aniline layer, and may be recovered therefrom by known methods, as for example, by evaporation and crystallization. It can be converted into D-glucuronic acid, by known methods, if desired.

According to my invention alpha-methyl-D-glucoside in aqueous solution is oxidized by means of an oxygen-containing gas, such as oxygen or air. The oxidation process is carried out at pH 4–9.5, maintained by the addition of alkali, in the presence of a platinum, preferably a platinum-activated carbon catalyst. The temperature employed may vary over a wide range, as for example, room temperature up to 70° C. and the reaction is benefited by continuous and vigorous agitation, although this is not absolutely necessary. The product is a mixture comprising the salt of alpha-methyl-D-glucuronoside. This mixture is then acidified to pH 1.5–2 with a suitable acid. I prefer a non-oxidizing mineral acid, such as sulfuric acid, for reasons of convenience. The acidified solution is then concentrated to dryness, preferably at a temperature below 50° C. Alpha-methyl-D-glucuronoside and other sugar acids present in the residue are then extracted with a selective solvent, as for example hot methanol or ethanol to separate these acids from the residual mineral salt. The extract is subsequently evaporated in vacuo to a sirup.

The separation of the residual mineral salt, composed of the cation of the alkali added during the oxidation and the anion of the mineral acid subsequently added, may take place during the later steps, but it is convenient to do so immediately upon liberation of the free organic acids as described above.

The sirup, freed of mineral salt, is then hydrolyzed with a suitable acid, preferably a non-oxidizing mineral acid. The resulting hydrolysate is composed of D-glucuronic acid admixed with other sugar acids. One of the features of my process, and an integral part thereof, is the recovery of the D-glucuronate salt in the pure state from this crude acid hydrolysate. I accomplish this recovery by means of the aniline N-D-glucuronoside salt.

The hydrolysate may be evaporated to a small volume for convenience in handling. It is then neutralized with an alkaline agent and treated with a molecular excess of aniline. At this point the pH of the mixture may be adjusted to 4–5 with acid to facilitate the precipitation of aniline N-D-glucuronoside salt. The precipitation may be further facilitated by the addition of ethanol. The salt is then separated by decantation or filtration.

The alkaline agent used to neutralize the crude acid hydrolysate containing glucuronic acid may be an oxide, hydroxide, carbonate or bicarbonate of an alkali metal or ammonia. The cation of this base is the cation of the aniline N-D-glucuronoside salt, and of the glucuronate salt finally recovered. For reasons of convenience, I prefer to employ as this alkaline agent sodium or potassium hydroxide.

The desired glucuronic acid can be recovered from the separated aniline N-D-glucuronoside salt in either of two ways. This glucuronoside salt may be treated with a weak acid such as acetic acid to split away the aniline by hydrolysis. The freed aniline is removed from the solution by extraction with a suitable solvent such as ether. The raffinate is an aqueous solution containing the glucuronate salt. This salt may be recovered from the solution by known methods, as for example, concentration to a small volume in vacuo, followed by the addition of ethanol to precipitate the salt.

The recovery may also be effected by treating with benzaldehyde. This removes the aniline from the glucuronoside, resulting in the formation of benzal-aniline, which may then be removed by extraction.

The following specific examples illustrate the invention.

EXAMPLE 1

Thirty-five grams of alpha-methyl-D-glucoside were dissolved in a liter of water in a 3-liter creased flask. To this solution was added 15.1 grams of sodium bicarbonate and after it had dissolved 7 grams of platinum-activated carbon catalyst containing 13 percent platinum was introduced. The mixture was vigorously stirred at 50° C. and air passed through at the rate of 112 liters per hour. After 25 hours the pH of the reaction mixture was 6.7. The catalyst was then removed by filtration and washed with water. The filtrate and washings were concentrated in vacuo to about 300 cc. and treated with 4 N sulfuric acid to obtain pH 2. The acidified solution was concentrated to dryness in vacuo at a bath temperature below 50° C. The residue was extracted with hot methanol and after removal of the methanol by vacuum evaporation, yielded 41.2 grams of sirup containing the free sugar acids formed in the oxidation.

A solution of 5.3 grams of the sirup in 50 cc. of N sulfuric acid was heated at 95°–100° C. in a steam bath for 15½ hours. The hydrolysis mixture was diluted to 100 cc. with water, partially decolorized with carbon and the sulfuric acid precipitated as barium sulfate by the addition of 7.9 grams of barium hydroxide octahydrate. The barium sulfate was filtered off, washed with water and the filtrate and washings combined and concentrated in vacuo to about 10 cc. The residual sirup was neutralized with sodium hydroxide solution and a solution of 3.5 cc. of aniline in 20 cc. of ethanol added. Fifty cc. more of ethanol was added and the solution adjusted to pH 4 with glacial acetic acid. After addition of 100 cc. of ethanol crystallization of sodium aniline N-D-glucuronoside began. After standing at 10° C. overnight the crude product was removed by filtration and washed with ethanol. After drying, it weighed 2.12 grams. It was recrystallized from 60 percent ethanol and had the following analysis:

Found: Na 7.8; N 4.2
Calc'd. for: Na 7.9; N 4.8
$C_{12}H_{14}O_6NNa$

Alternatively, the hydrolysis mixture may be neutralized with potassium or ammonium hydroxide, instead of sodium hydroxide, which results in the corresponding potassium or ammonium aniline N-D-glycuronoside after treatment with aniline.

EXAMPLE 2

CONVERSION OF SODIUM ANILINE N-D-GLUCURONO-
SIDE TO SODIUM D-GLUCURONATE

Method A

Three and five-tenths grams of sodium aniline N-D-glucuronoside prepared as in Example 1 was dissolved in 15 cc. of water and 0.5 cc. of glacial acetic acid introduced. The solution was heated at 90° C. for 10 minutes, and immediately extracted with ether to remove aniline. The water layer was filtered from a small amount of insoluble matter and the residue washed with water. The combined filtrate and washings (about 25 cc.) were stirred and treated with 250 cc. of ethanol and then 25 cc. of acetone, when sodium D-glucuronate crystallized out. The product was filtered and washed with 95 percent ethanol. After drying at 75° C. it weighed 2.9 grams. It had the following analysis:

Found: Na 9.8
Calc'd. for: Na 9.8
$C_6H_9O_7Na \cdot H_2O$

Reducing value by the Munson-Walker method showed product to be 100 percent sodium D-glucuronate monohydrate.

Method B

Six grams of sodium aniline N-D-glucuronoside, prepared as in Example 1, were dissolved in 25 cc. of water and 5 cc. of benzaldehyde added. The mixture was heated at 100° C. for ½ hour with a reflux condenser attached to the flask. The mixture was cooled and the benzal-aniline formed together with excess benzaldehyde removed by ether extraction. The water layer containing the sodium D-glucuronate was concentrated in vacuo to about 20 cc. To this was added 400 cc. of methanol and 100 cc. of acetone. The precipitated white sodium D-glucuronate monohydrate was removed by filtration, washed with acetone, and air dried. Yield, 4.3 grams. It had the following analysis:

Found: Na 9.8; C 31.5; H 4.9
Calc'd. for: Na 9.8; C 30.8; H 4.7
$C_6H_9O_7Na \cdot H_2O$ Analysis of the product by the Munson-Walker method showed it to be 99.4% pure.

EXAMPLE 3

PREPARATION OF SODIUM ANILINE
N-D-GLUCURONOSIDE

Ten grams of D-glycuronolactone were dissolved in 20 cc. of water and made slightly alkaline with 4 N sodium hydroxide solution. To the yellow-colored solution was added with stirring a solution of 15 cc. of aniline in 35 cc. of 95 percent ethanol. Crystallization of sodium aniline N-D-glycuronoside soon began. About 5 cc. of glacial acetic acid were added to acidify the mixture and greater crystallization occurred. After standing at room temperature for 15 minutes and at 10° C. for 1 hr., the product was filtered off and washed with methanol. After drying at 80° C., it weighed 11.0 grams (crop 1). Another crop of 0.5 gram crystallized from the combined mother liquor and washings.

Analysis of crop 1, dried 58°/mm. 4 hrs.
Found: Na 7.9; N 4.8
Calc'd. for: Na 7.9; N 4.8
$C_{12}H_{14}O_6NNa$

I claim:
1. The method which comprises oxidizing by means of free oxygen-containing gas alpha-methyl-D-glucoside in the presence of a catalyst, hydrolyzing with acid the resulting oxidation mixture containing alpha-methyl-D-glucuronoside, neutralizing the hydrolysate and treating the neutralized hydrolysate with aniline, thereby causing the precipitation of aniline N-D-glucoronoside salt and recovering from said salt by acid hydrolysis D-glucuronic acid salt.

2. In a process which comprises oxidizing alpha-methyl-D-glucoside by free oxygen-containing gas and subsequent hydrolysis of the oxidation mixture to form a crude hydrolysate consisting predominantly of D-glucuronic acid, the step which comprises recovering D-glucuronic acid from said crude mixture by treating said mixture with aniline at pH 4–5, separating the thus precipitated aniline N-D-glucuronoside, hydrolyzing with acid the separated aniline N-D-glucuronoside, removing the freed aniline from the reaction mixture, whereby an aqueous solution containing D-glucuronic acid salt remains and recovering said D-glucuronic acid salt.

3. The method which comprises oxidizing at pH 4 to 9.5, by means of free oxygen-containing gas alpha-methyl-D-glucoside in the presence of a platinum-activated carbon catalyst, hydrolyzing with a non-oxidizing mineral acid the resulting oxidation mixture containing alpha-methyl-D-glucuronoside, neutralizing the hydrolysate, separating mineral salt from the hydrolysate by selective extraction, treating the hydrolysate with aniline at pH 4–5, separating the thus precipitated aniline N-D-glucuronoside, hydrolyzing with acid the separated aniline N-D-glucuronoside, removing the freed aniline from the reaction mixture, whereby an aqueous solution containing D-glucuronic acid salt remains and recovering said D-glucuronic acid salt.

4. A process of preparing sodium-D-glucuronate comprising heating aqueous sodium aniline N-D-glucuronoside with benzaldehyde, extracting the benzal-aniline formed with ether, and precipitating the sodium-D-glucuronate monohydrate from the aqueous solution with methanol and acetone.

5. A process comprising oxidizing alpha-methyl-D-glucoside with molecular oxygen containing gas in the presence of platinum-activated carbon catalyst at pH 4 to 9.5, maintained by addition of alkali, acidifying, extracting alpha-methyl-D-glucuronoside, removing mineral salt, and hydrolyzing with acid to yield D-glucuronic acid.

CHARLES L. MEHLTRETTER.

REFERENCES CITED

The following references are of record in the file of this patent:

UNITED STATES PATENTS

| Number | Name | Date |
|---|---|---|
| 2,520,255 | Peterman | Aug. 29, 1950 |

OTHER REFERENCES

Weygand, Ber. 72B, 1663–1667 (1939).